United States Patent
Choe et al.

(10) Patent No.: US 9,734,874 B1
(45) Date of Patent: Aug. 15, 2017

(54) ADHESIVE LEAK CHANNEL STRUCTURE FOR HERMETIC SEALING OF A HARD DISK DRIVE

(71) Applicant: HGST Netherlands B.V., Amsterdam (NL)

(72) Inventors: Seong-Hun Choe, Fujisawa (JP); Kimihiko Sudo, Yokohama (JP); Yuta Onobu, Yokohama (JP); Takehito Nagata, Fujisawa (JP); Hajime Eguchi, Fujisawa (JP); Kyosuke Yoshida, Fujisawa (JP); Naoshi Mizumoto, Matsuda-machi (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/013,491

(22) Filed: Feb. 2, 2016

(51) Int. Cl.
| | |
|---|---|
| G11B 33/14 | (2006.01) |
| G11B 33/02 | (2006.01) |
| B29C 65/48 | (2006.01) |
| G11B 33/12 | (2006.01) |
| B29L 31/34 | (2006.01) |

(52) U.S. Cl.
CPC .......... G11B 33/1466 (2013.01); B29C 65/48 (2013.01); G11B 33/022 (2013.01); G11B 33/122 (2013.01); B29L 2031/34 (2013.01)

(58) Field of Classification Search
CPC .. G11B 33/122; G11B 33/123; G11B 33/1446
USPC ................................ 360/99.23, 99.24, 99.25
See application file for complete search history.

(56) References Cited

U.S. PATENT DOCUMENTS

| | | | |
|---|---|---|---|
| 5,709,724 A | 1/1998 | Naugler et al. | |
| 6,769,699 B2 | 8/2004 | Seki et al. | |
| 7,599,147 B2 | 10/2009 | Gunderson | |
| 7,872,836 B2 | 1/2011 | Shindo et al. | |
| 7,876,527 B2 | 1/2011 | Nakamiya et al. | |
| 8,035,923 B2 | 10/2011 | Suzuki et al. | |
| 8,179,631 B2 | 5/2012 | Aoyagi et al. | |
| 8,234,771 B2 * | 8/2012 | Farooqui ................ | B23Q 3/084 269/104 |
| 8,749,914 B2 | 6/2014 | Otake et al. | |
| 8,908,318 B2 * | 12/2014 | Lee ....................... | G11B 25/043 360/97.11 |
| 9,007,717 B2 * | 4/2015 | Okutani ............... | G11B 25/043 277/637 |
| 9,230,598 B1 * | 1/2016 | Bernett ................ | G11B 25/043 |
| 2007/0263319 A1 * | 11/2007 | Calderon ........... | G11B 33/1466 360/99.21 |
| 2008/0259503 A1 * | 10/2008 | Aoyagi .................. | G11B 33/08 360/244 |
| 2009/0097163 A1 * | 4/2009 | Suzuki ............... | G11B 33/1466 360/245.8 |

(Continued)

Primary Examiner — Jefferson Evans
(74) Attorney, Agent, or Firm — John D. Henkhaus

(57) ABSTRACT

In the context of a hard disk drive (HDD), an adhesive leak channel structural feature is positioned in an area at which an electrical feed-through is adhered with an adhesive to an enclosure base, where the leak channel feature inhibits the leakage of gas through the adhesive. Embodiments include providing the leak channel feature on the base and/or on the feed-through. Embodiments may further include application of an electrodeposition coating to the base in an area at which the adhesive is in contact.

13 Claims, 6 Drawing Sheets

(56) References Cited

U.S. PATENT DOCUMENTS

| | | | |
|---|---|---|---|
| 2010/0328815 A1* | 12/2010 | Nakatsuka | G11B 25/043 360/110 |
| 2012/0275056 A1* | 11/2012 | Mcguire, Jr. | G11B 33/122 360/110 |
| 2015/0257293 A1* | 9/2015 | Hirano | G11B 33/1446 361/679.33 |
| 2016/0111814 A1* | 4/2016 | Hirano | H01R 13/58 361/679.33 |

* cited by examiner

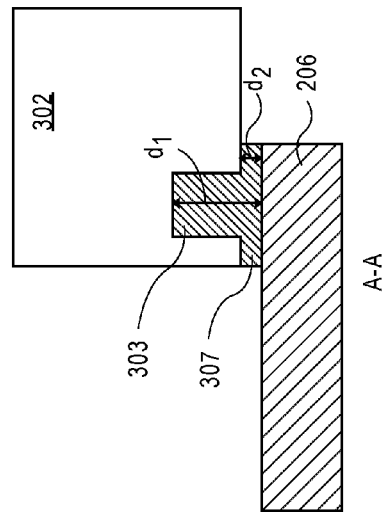
FIG. 3A (PRIOR ART)
FIG. 3B
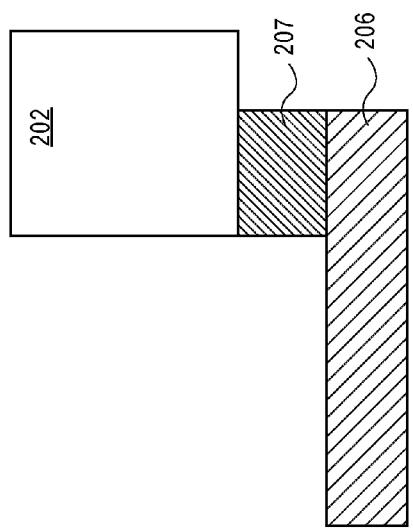
FIG. 3C
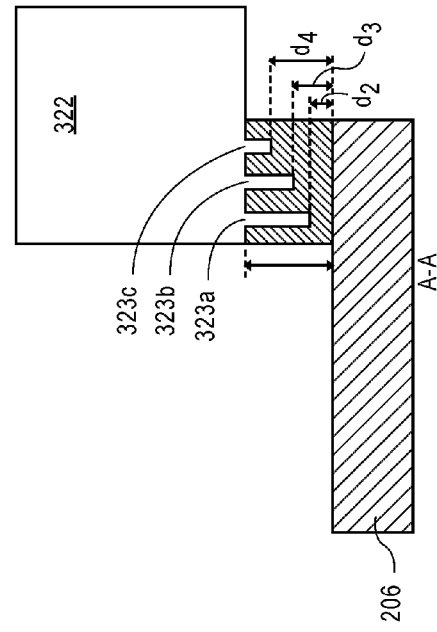
FIG. 3D

ADHESIVE LEAK CHANNEL STRUCTURE FOR HERMETIC SEALING OF A HARD DISK DRIVE

FIELD OF EMBODIMENTS

Embodiments of the invention may relate generally to hard disk drives and more particularly to a leak channel structure for an adhesive used to hermetically seal a hard disk drive.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

Electronic systems that require a hermetically sealed internal volume (e.g., a lighter-than-air gas filled, sealed HDD) need a way of connecting electrical lines through the HDD enclosure. This may be accomplished with a hermetic electrical connector or electrical "feed-through" (or simply "feed-through"), such as a feed-through based on FR-4 glass-reinforced epoxy. One approach to hermetically sealing such an electrical feed-through is to apply solder around the perimeter of the feed-through near where the feed-through interfaces with the HDD enclosure base. However, such a soldering process may be a relatively costly process in the context of mass production of HDDs. An alternative approach to hermetically sealing such an electrical feed-through is to apply adhesive around the perimeter of the feed-through near where the feed-through interfaces with the base. However, this approach may pose challenges with achieving a reliable yet robust hermetic seal.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a hard disk drive (HDD) in which an adhesive leak channel structural feature is positioned in an area at which an electrical feed-through is adhered with an adhesive to an HDD enclosure base, where the leak channel feature inhibits the leakage of gas through the adhesive, as described in more detail herein.

Specific alternative embodiments include providing the leak channel feature on the base and/or on the feed-through. For example, embodiments may include (a) a leak channel structural feature forming a recess within the base; (b) a leak channel structural feature forming a convex protuberance extending from the base; (c) a leak channel structural feature forming a series of increasingly smaller structures, in a direction from the inside to the outside of the HDD internal space, extending from the base; and (d) a leak channel structural feature comprising a convex solder ring on a bonding surface of the feed-through. Further, embodiments may include application of an electrodeposition coating to the base in an area at which the adhesive is in contact, for reasons as described in more detail herein.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3A is a cross-sectional side view illustrating an HDD electrical feed-through interface;

FIG. 3B is a cross-sectional side view illustrating an HDD electrical feed-through interface, according to a first embodiment;

FIG. 3C is a cross-sectional side view illustrating an HDD electrical feed-through interface, according to a second embodiment;

FIG. 3D is a cross-sectional side view illustrating an HDD electrical feed-through interface, according to a third embodiment;

DETAILED DESCRIPTION

Approaches to an adhesive leak channel structural feature positioned in an area at which an electrical feed-through is adhered with an adhesive to an HDD enclosure base are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hard disk drive (HDD) storage device. Thus, in accordance with an embodiment, a plan view illustrating an HDD 100 is shown in FIG. 1 to illustrate an exemplary operating context.

Figure 1:
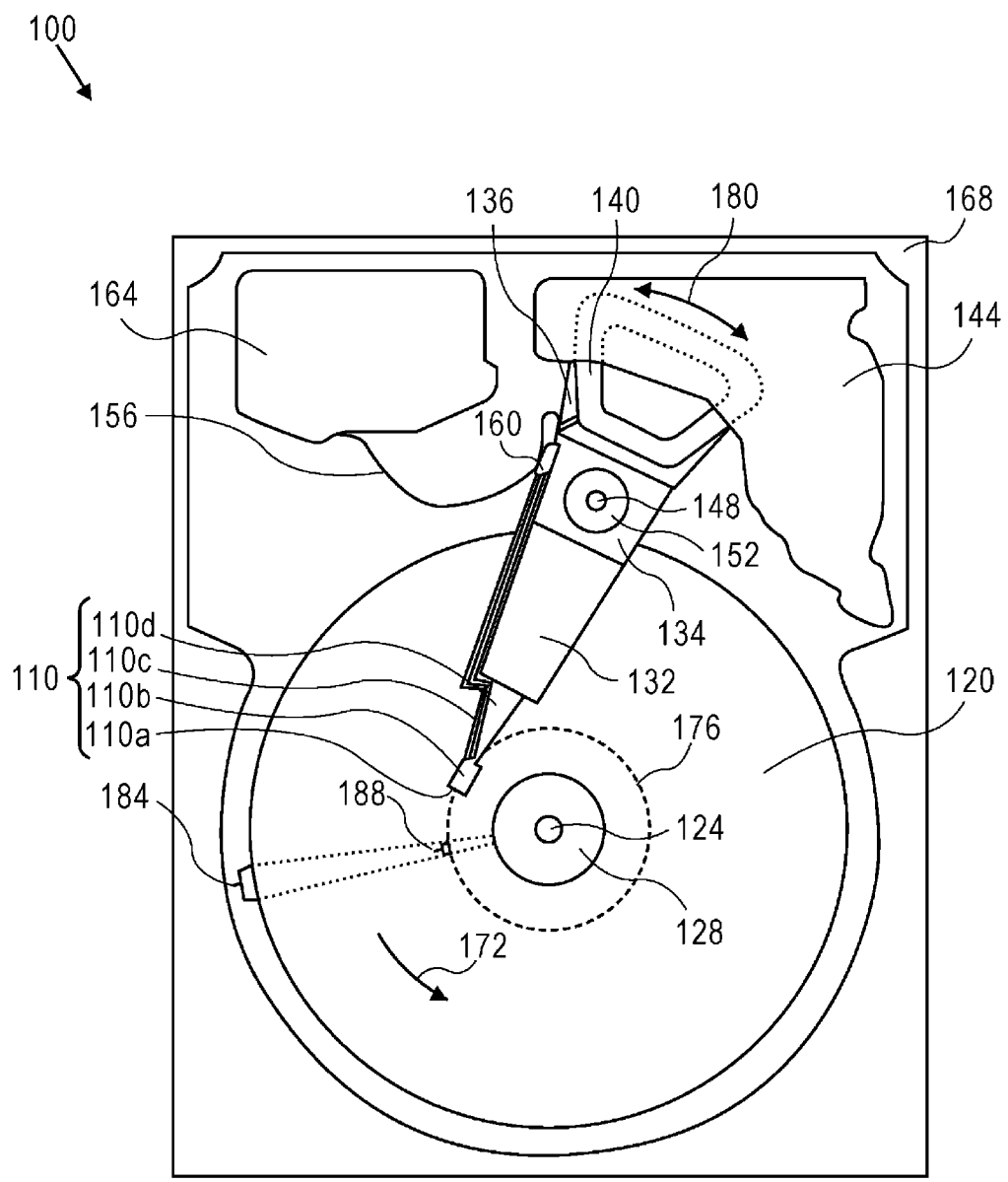
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak free.

Recall that hermetically-sealed electronic systems often need a way of connecting electrical lines through the enclosure, which may be accomplished with a hermetic electrical connector or electrical feed-through soldered or otherwise adhered to the HDD enclosure base.

Figure 2A:
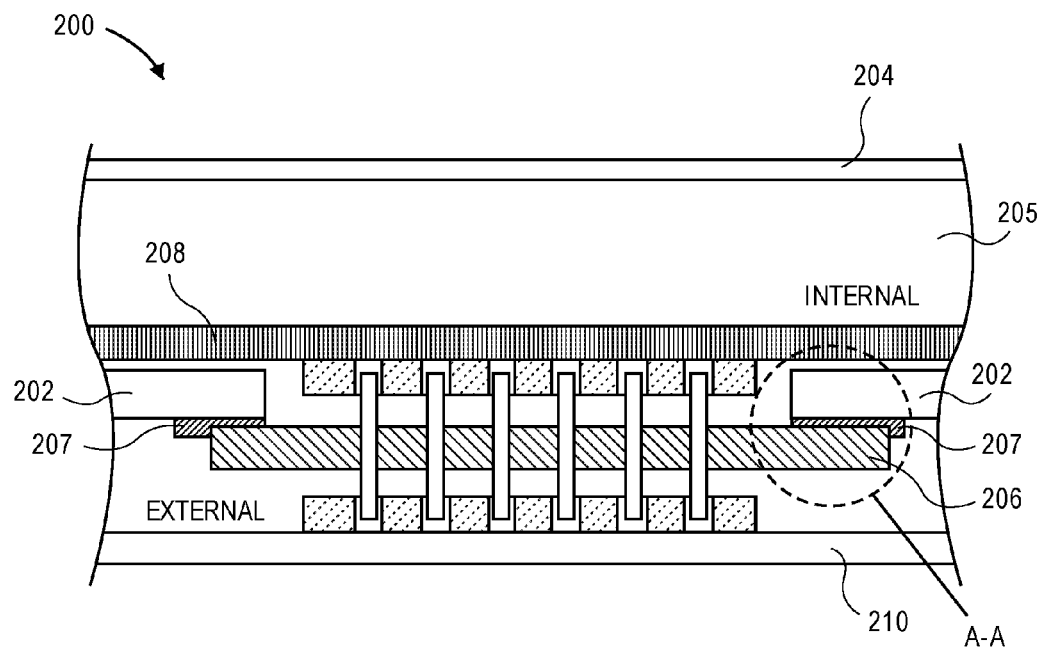
FIG. 2A is a cross-sectional side view illustrating an HDD electrical feed-through interface, according to an embodiment.
Figure 2B:
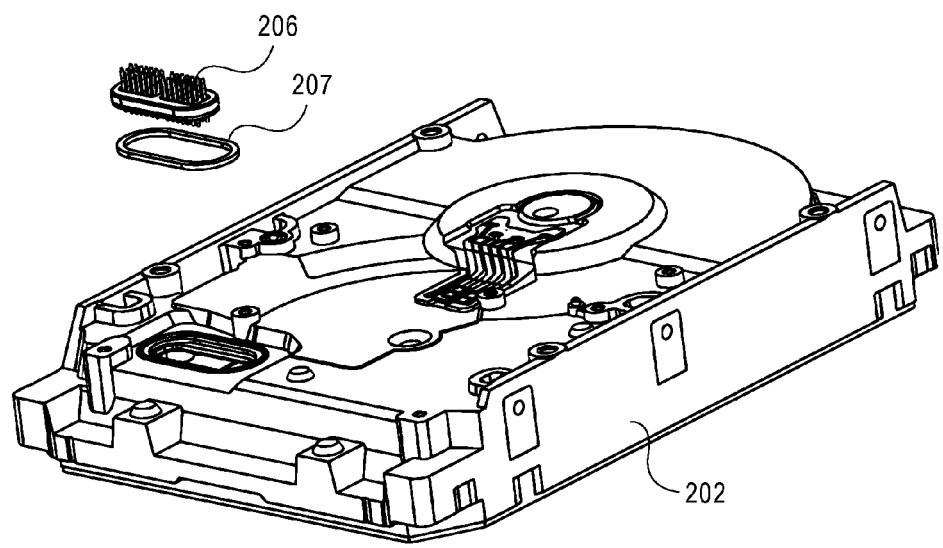
FIG. 2B is a bottom perspective view illustrating an HDD electrical feed-through interface, according to an embodiment.

FIG. 2A is a cross-sectional side view illustrating an HDD electrical feed-through interface, according to an embodiment. Hermetically-sealed HDD 200 comprises an enclosure base 202 coupled with an HDD cover 204, thereby enclosing a sealed internal space 205. In order to electrically connect a flexible cable assembly 208 that is located inside the internal space 205 with a printed circuit board (PCB) 210 that is coupled to the base 202 outside of the internal space 205, a hermetic electrical feed-through 206 (or "feed-through" or "feed-through connector") is used at the interface between the internal space 205 and the external environment, i.e., at an orifice of the base 202. The feed-through 206 is attached to the base 202 using solder 207, for example. In the configuration depicted in FIG. 2A, the feed-through 206 is shown soldered to the underside of the base 202. While effective hermetically, the foregoing sealing arrangement may not be the most cost-effective approach due to, for example, the enclosure base nickel-plating process. FIG. 2B is a bottom perspective view illustrating an HDD electrical feed-through interface, according to an embodiment. FIG. 2B illustrates a non-limiting example of a position for the feed-through 206 and corresponding solder 207, in relation to the base 202 of hermetically-sealed HDD 200.

Another approach to connecting electrical lines through a hermetically-sealed HDD enclosure may involve attaching the feed-through 206 to the base 202 using an adhesive, such as an epoxy-based adhesive, for a non-limiting example. However, this approach may pose challenges with achieving a robust hermetic seal while at the same time achieving a reliable adhesive bond. That is, because adhesives such as epoxies are generally relatively permeable to low-density, lighter-than-air gases (e.g., helium, nitrogen), in comparison with a metal or glass, the tendency to providing a stronger adhesive bond by simply forming a thicker adhesive bond would likely result in a larger leak path. Furthermore, increasing the bond area is typically structurally and dimensionally constrained. As a corollary, simply forming a thinner adhesive bond in order to decrease the leak rate would likely result in a weaker bond that may approach failure by stresses due to, for example, the difference in thermal expansion coefficients corresponding to the different materials used for the base, the feed-through, and the adhesive. Hence, a reliable and robust hermetic seal may be desirable.

Leakage Through Adhesive

FIG. 3A is a cross-sectional side view illustrating an HDD electrical feed-through interface. FIG. 3A generally depicts an area, A-A, highlighted in FIG. 2A. A conventional feed-through interface may comprise an enclosure base 202 coupled with a hermetic electrical feed-through 206 (or "feed-through" or "feed-through connector") at the interface between the HDD internal environment or space and the external environment, i.e., at an orifice of the base 202 (see, e.g., FIG. 2A). For non-limiting examples, the feed-through 206 may be composed of a glass body with plated straight pins or a PCB-based feed-through, which is described in more detail elsewhere herein.

In this example, the feed-through 206 is attached to the base 202 using an adhesive 207a having a depth $d_1$. A low-density, lighter-than-air gas housed in an HDD under normal storage and operating conditions would tend to leak, or pass, from the internal environment to the external environment, through the adhesive 207a (depicted with the block arrow from internal to external). The rate of leakage depends in part on the physical configuration of and permeability of the adhesive, where permeation refers to the phenomenon of transportation of gas through a solid, a process generally based on the solubility of the gas into the solid and subsequent diffusion of the gas through the solid. Thus, with other variables held constant and for a particular adhesive, as the adhesive depth $d_1$ is increased (e.g., to form a stronger adhesive bond), the leak rate through the adhesive, i.e., through the "leak channel", would increase accordingly.

Leak Channel Structural Features—Base

An approach to sealing a hard disk drive, namely in the area of the base-to-feed-through interface, involves the use of a leak channel structural feature to inhibit the leakage of gas from the HDD internal environment or space to the external environment, according to an embodiment.

FIG. 3B is a cross-sectional side view illustrating an HDD electrical feed-through interface, according to a first embodiment. FIG. 3B generally depicts an area, A-A, highlighted in FIG. 2A. This feed-through interface comprises an enclosure base 302 coupled with the feed-through 206 at the interface between the HDD internal environment and the external environment.

According to an embodiment, the base 302 comprises a leak channel structural feature formed as a recess 303 (e.g., a groove or furrow) in the base 302. According to an embodiment, the recess 303 is positioned to structurally mate with an area corresponding to or near the outer perimeter of the feed-through 206. Preferably, the recess 303 is positioned around the entire perimeter of (or at least a large majority of) the feed-through 206, because the adhesive bonding area between the base 302 and the feed-through 206 would likewise follow this same or similar pattern. Note that while the recess 303 is depicted in FIG. 3B for purposes of clarity and simplicity as rectangular-shaped with sharp corners, the shape of the recess 303 may vary from implementation to implementation.

The feed-through 206 is attached to the base 302 using an adhesive 307a, where the portion of the adhesive 307a disposed within and over the recess 303 has a depth $d_1$, and the portion of the adhesive 307a disposed adjacent to the recess 303 has a depth $d_2$. According to an embodiment, and as depicted in FIG. 3B, the depth $d_1$ is greater than the depth $d_2$. Hence, use of a recess such as recess 303 provides for a substantial adhesive bond based on the adhesive depth $d_1$, while simultaneously inhibiting the gas leakage through the adhesive 307a by reducing, limiting, minimizing the adhesive depth $d_2$ through which gas is most likely to leak. Stated otherwise, use of the recess 303 (a leak channel structural feature) provides for a narrow leak channel between the internal and external environments, thereby inhibiting leakage therethrough. The leak channel is effectively narrowed by narrowing the leak channel inlet (internal side) and the leak channel outlet (external side) on each respective side of the recess 303. Furthermore, the recess 303 acts as a stress-reducing feature for stress that might otherwise be consequent to the adhesive curing process, as well as the difference in the respective coefficient of thermal expansion corresponding to each of the base 302, the adhesive 307a, and the feed-through 206.

FIG. 3C is a cross-sectional side view illustrating an HDD electrical feed-through interface, according to a second embodiment. FIG. 3C generally depicts an area, A-A, highlighted in FIG. 2A. This feed-through interface comprises an enclosure base 312 coupled with the feed-through 206 at the interface between the HDD internal environment and the external environment.

According to an embodiment, the base 312 comprises a leak channel structural feature formed as a convex protuberance 313 (e.g., where at least the end is convex) extending from the base 312. According to an embodiment, the protuberance 313 is positioned to structurally mate with an area corresponding to or near the outer perimeter of the feed-through 206. Preferably, the protuberance 313 is positioned around the entire perimeter of (or at least a large majority of) the feed-through 206, because the adhesive bonding area between the base 312 and the feed-through 206 would likewise follow this same or similar pattern.

The feed-through 206 is attached to the base 312 using an adhesive 317a, where the portion of the adhesive 317a disposed between the protuberance 313 and the feed-through 206 has a depth $d_2$, and the portion of the adhesive 317a disposed adjacent to the protuberance 313 has a depth $d_1$. According to an embodiment, and as depicted in FIG. 3C, the depth $d_2$ is less than the depth $d_1$. Hence, use of a protuberance such as convex protuberance 313 provides for a substantial adhesive bond based on the adhesive depth $d_1$, while simultaneously inhibiting the gas leakage through the adhesive 317a by reducing, limiting, minimizing the adhesive depth $d_2$ through which gas is most likely to leak. Stated otherwise, use of the protuberance 313 (a leak channel structural feature) provides for a narrow leak channel between the internal and external environments, thereby inhibiting leakage therethrough. The leak channel is effectively narrowed by choking the passage of gas through the leak channel, to which the protuberance 313 forms a fence or barrier.

FIG. 3D is a cross-sectional side view illustrating an HDD electrical feed-through interface, according to a third embodiment. FIG. 3D generally depicts an area, A-A, highlighted in FIG. 2A. This feed-through interface comprises an enclosure base 322 coupled with the feed-through 206 at the interface between the HDD internal environment and the external environment.

According to an embodiment, the base 322 comprises a leak channel structural feature formed as a series of increasingly smaller structures 323a, 323b, 323c extending from the base 322 toward the feed-through 206. These structures 323a, 323b, 323c are increasingly smaller in the direction from the internal space through the adhesive and to the external space, as depicted in FIG. 3D. Note that while the structures 323a, 323b, 323c are depicted in FIG. 3D for purposes of clarity and simplicity as rectangular-shaped with sharp corners, the shape of the structures 323a, 323b, 323c may vary from implementation to implementation. Note also that the number of structures in the series may vary from implementation to implementation. According to an embodiment, the series of structures 323a, 323b, 323c is positioned to structurally mate with an area corresponding to or near the outer perimeter of the feed-through 206. Preferably, the series of structures 323a, 323b, 323c is positioned around the entire perimeter of (or at least a large majority of) the feed-through 206, because the adhesive bonding area between the base 322 and the feed-through 206 would likewise follow this same or similar pattern.

The feed-through 206 is attached to the base 322 using an adhesive 327a, where the portions of the adhesive 327a disposed between the series of structures 323a, 323b, 323c and the feed-through 206, each have a respective depth $d_2$, $d_3$, $d_4$ that increases in the same direction as the respective height of the series of structures 323a, 323b, 323c decreases. According to an embodiment, and as depicted in FIG. 3D, each depth $d_2$, $d_3$, $d_4$ is less than the depth $d_1$ of the portions of the adhesive 327a between adjacent structures 323a, 323b, 323c. Hence, use of a series of structures such as series of structures 323a, 323b, 323c provides for a substantial adhesive bond based on the adhesive depth $d_1$, while simultaneously inhibiting the gas leakage through the adhesive 327a by reducing, limiting, minimizing the adhesive depths $d_2$, $d_3$, $d_4$ through which gas is most likely to leak. Stated otherwise, use of the series of structures 323a, 323b, 323c (a leak channel structural feature) provides for a narrow leak channel between the internal and external environments, thereby inhibiting leakage therethrough. The leak channel is effectively narrowed by controlling the gradient of gas concentration across the series of increasingly smaller structures 323a, 323b, 323c.

In the context of the foregoing embodiments described and illustrated in reference to FIGS. 3B-3D, according to an embodiment, an electrodeposition (ED) coating (or electrodeposited coating) is applied to the base 302, 312, 322 in an area at which the adhesive in in contact with the base 302, 312, 322. Use of an ED coating on the adhesive contact surface may provide a stronger, more reliable adhesive bond based on an anchor effect, whereby the adhesive can penetrate deeper into the microstructure (roughness) of the ED coating surface, in comparison with adhesion to an untreated metal surface. Essentially any ED coating that may be typically used for the HDD base is suitable for this purpose, such as an epoxy resin paint, for a non-limiting example.

Leak Channel Structural Feature—Feed Through

Figure 4:
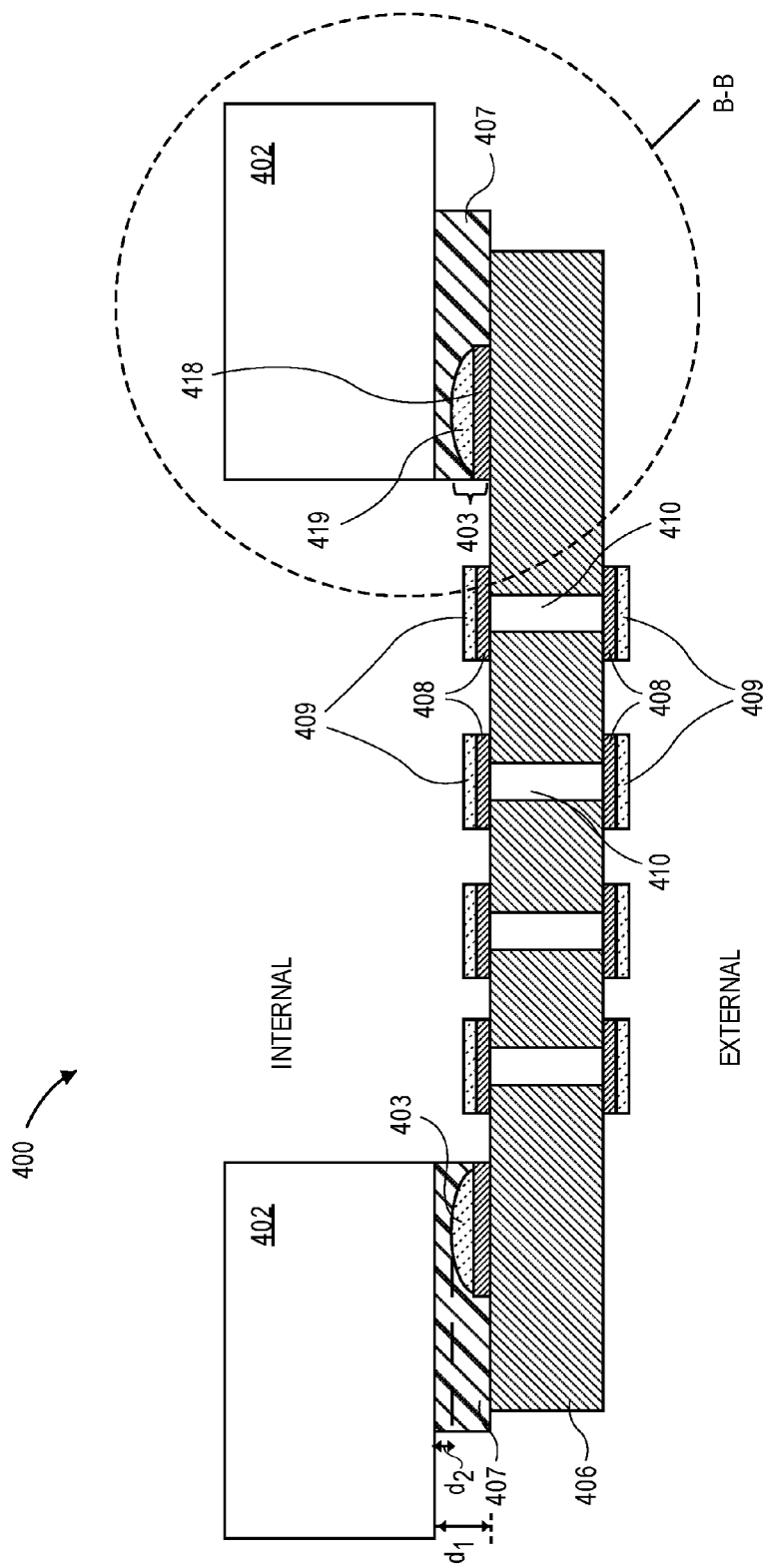
FIG. 4 is a cross-sectional side view illustrating an HDD electrical feed-through interface, according to a fourth embodiment.

FIG. 4 is a cross-sectional side view illustrating an HDD electrical feed-through interface, according to a fourth embodiment. Interface 400 comprises an enclosure base 402 coupled with a hermetic electrical feed-through 406 ("feed-through 406") at the interface between an internal space and the external environment, at an orifice of the base 402. The feed-through 406 is attached to the underside of the base 402 using an adhesive 407, such as an epoxy-based adhesive, for a non-limiting example.

According to an embodiment, feed-through 406 is composed of a laminate structure having at least one insulator layer (e.g., FR-4 glass-reinforced epoxy or plastic laminate). Feed-through 406 may be referred to as a PCB (printed circuit board) based feed-through, fabricated using materials and processes generally associated with PCBs. One advantage of using PCB-based components, generally, and a PCB-based electrical feed-through, specifically, is the relatively low cost associated with a now mature fabrication approach. Feed-through 406 further comprises a plurality of electrical connections (sometimes referred to generally as an "electrical pad" or simply a "pad"), each comprising a solder pad 409 over a conductor pad 408 (e.g., copper), with each electrical pad electrically connected to an opposing electrical pad by way of a respective via 410. The number of electrical connections illustrated in FIG. 4 is for purposes of example only and, therefore, the number of electrical connections constituent to an electrical feed-through such as feed-through 406 may vary from implementation to implementation.

According to an embodiment, feed-through 406 comprises a leak channel structural feature formed as a convex solder ring 403 positioned on a bonding surface of the feed-through 406 (i.e., the general area at which the feed-through 406 is bonded with the base 402). Preferably, the solder ring 403 is positioned around the entire perimeter of (or at least a large majority of) the feed-through 406, because the adhesive bonding area between the base 402 and the feed-through 406 would likewise follow this same or similar pattern. For ease of manufacturing, the solder ring 403 is composed (similarly to the electrical pads) of a convex solder pad 419 over a conductor pad ring 418 (e.g., copper) around the perimeter of the feed-through 406, according to an embodiment. Thus, the solder ring 403 can be formed in conjunction with the same manufacturing process used to fabricate the electrical pads.

The feed-through 406 is attached to the base 402 using the adhesive 407, where the portion of the adhesive 407 disposed between the solder ring 403 and the feed-through 406 has a depth $d_2$, and the portion of the adhesive 407 disposed adjacent to the solder ring 403 has a depth $d_1$. According to an embodiment, and as depicted in FIG. 4, the depth $d_2$ is less than the depth $d_1$. Hence, use of a feed-through solder ring such as convex solder ring 403 provides for a substantial adhesive bond based on the adhesive depth $d_1$, while simultaneously inhibiting the gas leakage through the adhesive 407 by reducing, limiting, minimizing the adhesive depth $d_2$ through which gas is most likely to leak. Stated otherwise, use of the solder ring 403 (a leak channel structural feature) provides for a narrow leak channel between the internal and external environments, thereby inhibiting leakage therethrough.

In the context of the foregoing embodiments described and illustrated in reference to FIG. 4, according to an embodiment, an electrodeposition (ED) coating (or electrodeposited coating) is applied to the base 402 in an area at which the adhesive in in contact with the base 402. Again, use of an ED coating on the adhesive contact surface may provide a stronger, more reliable adhesive bond based on an anchor effect, whereby the adhesive can penetrate into the microstructure (roughness) of the ED coating surface.

Figure 5A:
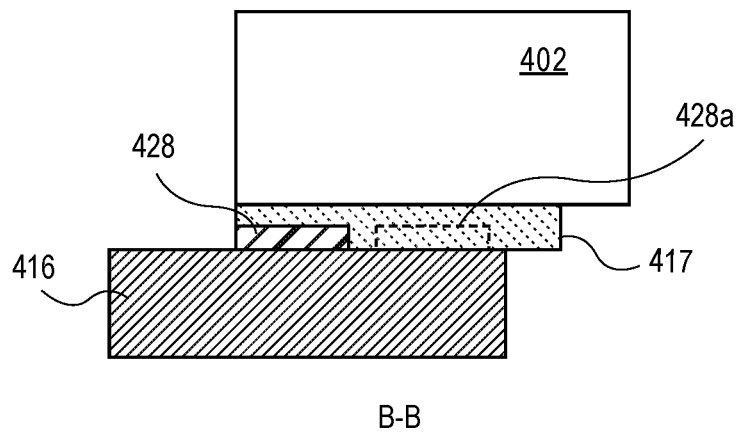
FIG. 5A is a cross-sectional side view illustrating an HDD electrical feed-through interface, according to a fifth embodiment.

FIG. 5A is a cross-sectional side view illustrating an HDD electrical feed-through interface, according to a fifth embodiment. FIG. 5A generally depicts an area, B-B, highlighted in FIG. 4. According to an embodiment, and similar to the embodiment described in reference to FIG. 4, an electrical feed-through 416 is provisioned with a conductor pad ring 428 (e.g., copper) around and/or near the outer perimeter of the feed-through 416, but absent a solder pad such as convex solder pad 419 over the conductor pad ring 428. The precise positioning of the conductor pad ring 428 in relation to the base 402, electrical feed-through 416, and adhesive 417 (e.g., solder) may vary from implementation to implementation. For example, an alternative position for the conductor ring pad may be as depicted as conductor pad ring 428a.

In such a scenario as depicted in FIG. 5A, the thickness of the conductor pad ring 428 may be made thinner than the thickness of solder ring 403 (FIG. 4). However, the gas leakage through the solder 417 is still inhibited by reducing, limiting, minimizing the overall adhesive depth (denoted as $d_1$ in FIG. 4) as well as the adhesive depth through which gas is most likely to leak (denoted as $d_2$ in FIG. 4). Furthermore, the overall adhesive depth may be less than in the scenario depicted in FIG. 4 because of the absence of the convex solder pad 419 over the conductor pad ring 428. Thus, use of the conductor pad ring 428 (a leak channel structural feature) provides for a narrow leak channel between the internal and external environments, thereby inhibiting leakage therethrough.

Figure 5B:
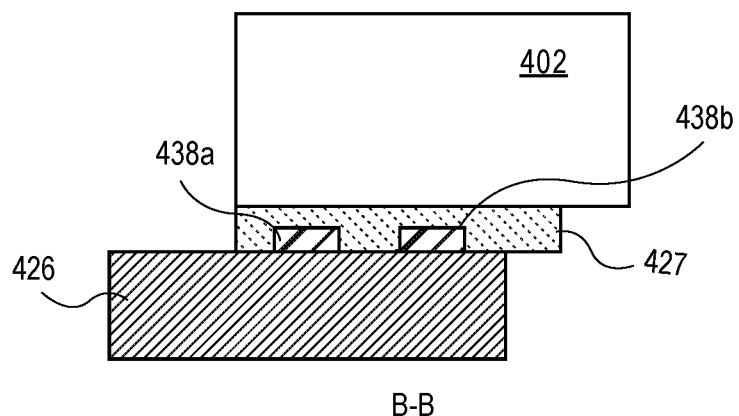
FIG. 5B is a cross-sectional side view illustrating an HDD electrical feed-through interface, according to a sixth embodiment.

FIG. 5B is a cross-sectional side view illustrating an HDD electrical feed-through interface, according to a sixth embodiment. FIG. 5B generally depicts an area, B-B, highlighted in FIG. 4. According to an embodiment, and similar to the embodiment described in reference to FIG. 4, an electrical feed-through 426 is provisioned with a plurality of concentric conductor pad rings 438a, 438b (e.g., copper) around and/or near the outer perimeter of the feed-through 426, also absent a solder pad such as convex solder pad 419 over either or both of the conductor pad rings 438a, 438b. The precise positioning of the conductor pad rings 438a, 438b in relation to the base 402, electrical feed-through 426, and adhesive 427 (e.g., solder), as well as the number of concentric conductor pad rings employed, may vary from implementation to implementation.

Like in the scenario depicted in FIG. 5A, in such a scenario as depicted in FIG. 5B, the thickness of each of the conductor pad rings 438a, 438b may be made thinner than the thickness of solder ring 403 (FIG. 4). However, the gas leakage through the solder 427 is still inhibited by reducing, limiting, minimizing the overall adhesive depth (denoted as $d_1$ in FIG. 4) as well as the adhesive depth through which gas is most likely to leak (denoted as $d_2$ in FIG. 4). Furthermore, the overall adhesive depth may be less than in the scenario depicted in FIG. 4 because of the absence of the convex solder pad 419 over the conductor pad rings 438a, 438b. Thus, use of multiple conductor pad rings 438a, 438b (a leak channel structural feature) provides for a narrow leak channel between the internal and external environments, thereby inhibiting leakage therethrough.

A Method of Sealing a Hard Disk Drive

Figure 6:
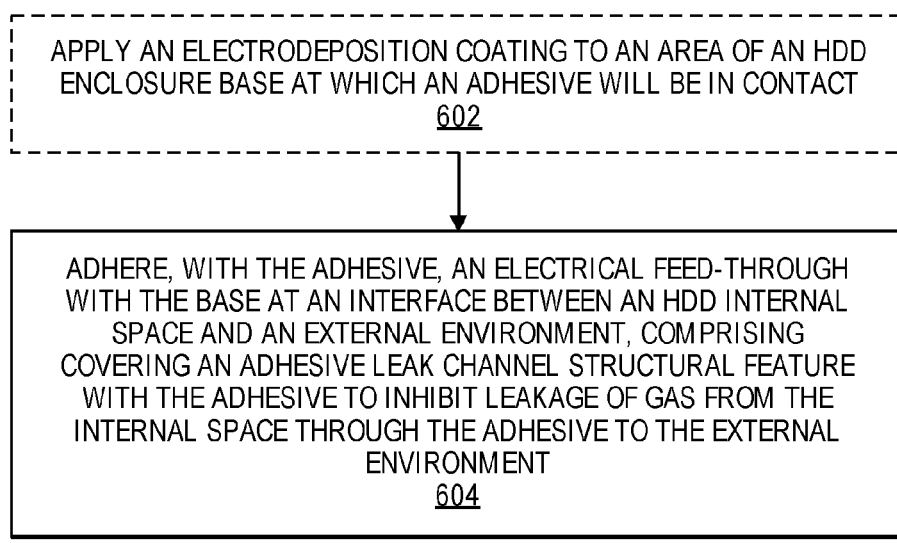
FIG. 6 is a flow diagram illustrating a method of sealing an HDD, according to an embodiment.

FIG. 6 is a flow diagram illustrating a method of sealing an HDD, according to an embodiment.

At optional block 602, an electrodeposition (ED) coating may be applied to a hard disk drive (HDD) enclosure base at an area at which an adhesive will be in contact with the base. For example, an ED coating such as epoxy resin paint is applied to the base 302, 312, 322 (FIGS. 3B-3D) at the area(s) at which the adhesive 307a, 317a, 327a (FIGS. 3B-3D), respectively, is in contact with the respective base 302, 312, 322. For another example, an ED coating such as epoxy resin paint is applied to the base 402 (FIG. 4) at the area(s) at which the adhesive 407 (FIG. 4) is in contact with the base 402.

At block 604, an electrical feed-through is adhered with the base with an adhesive, at an interface between an HDD internal space and an external environment. The process of adhering the feed-through with the base includes covering an adhesive leak channel structural feature with the adhesive to inhibit leakage of gas from the internal space through the adhesive to the external environment. For example, the feed-through 206 is adhered, affixed to a respective base 302, 312, 322 (FIGS. 3B-3D) with a respective adhesive 307a, 317a, 327a (FIGS. 3B-3D), whereby a respective leak channel structural feature (e.g., recess 303 of FIG. 3B, convex protuberance 313 of FIG. 3C, series of structures 323a, 323b, 323c of FIG. 3D) is covered with the respective adhesive 307a, 317a, 327a. For another example, the feed-through 406 is adhered, affixed to the base 402 (FIG. 4) with the adhesive 407, whereby the leak channel structural feature (e.g., convex solder ring 403) is covered with the adhesive 407.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive having an internal space, the hard disk drive comprising:
    an enclosure base enclosing at least a portion of said internal space;
    a printed circuit board (PCB) coupled with said base external to said internal space;
    an electrical feed-through adhered with an adhesive to said base and providing an electrical path between said PCB and said internal space; and
    an adhesive leak channel structural feature positioned in an area of said adhesive, wherein said leak channel structural feature inhibits leakage of gas from said internal space through said adhesive;
    wherein said adhesive is positioned between said base and said feed-through, and wherein said leak channel structural feature forms a convex protuberance protruding substantially perpendicularly from an external surface of said base, and wherein a portion of said adhesive is disposed between said protuberance and said feed-through, and a portion of said adhesive is disposed adjacent to said protuberance, such that a depth of said adhesive disposed adjacent to said protuberance is greater than a depth of said adhesive disposed between said protuberance and said feed-through.

2. The hard disk drive of claim 1, wherein said leak channel structural feature is positioned to structurally mate with and around an outer perimeter of said electrical feed-through.

3. The hard disk drive of claim 1, wherein said adhesive is positioned between said base and said feed-through, and wherein an area of said base at which said adhesive is in contact comprises an electrodeposition coating.

4. A method of sealing a hard disk drive (HDD), the method comprising:
    adhering, with an adhesive, an electrical feed-through with an HDD enclosure base at an interface between an HDD internal space and an external environment, said adhering comprising covering an adhesive leak channel structural feature with said adhesive to inhibit leakage of gas from said internal space through said adhesive to said external environment;
    wherein said leak channel structural feature forms a convex protuberance protruding substantially perpendicularly from an external surface of said base;
    wherein adhering includes applying said adhesive between said base and said feed-through such that a first portion of said adhesive is disposed at a first depth between said protuberance and said feed-through, and a second portion of said adhesive is disposed at a second depth adjacent to said protuberance, and said second depth is greater than said first depth.

5. The method of claim 4, further comprising:
    prior to said adhering, applying an electrodeposition coating to an area of said base at which said adhesive is in contact.

6. A hard disk drive enclosure base comprising:
    a bottom surface;

an orifice through said bottom surface and provisioned for structurally interfacing with an electrical feed-through, said orifice surrounded by an orifice sidewall normal to said bottom surface; and an adhesive leak channel structure positioned in an area surrounding said orifice and formed to adhesively bond with said electrical feed-through while inhibiting leakage of gas through such an adhesive bond;

wherein said leak channel structure comprises a recess having a substantially U-shaped cross-section with walls extending into said base in a direction substantially normal to said bottom surface and substantially parallel to said orifice sidewall.

7. The hard disk drive enclosure base of claim 6, wherein an area corresponding to said adhesive bond comprises an electrodeposition coating.

8. A hard disk drive comprising the hard disk drive enclosure base of claim 6.

9. A hard disk drive having an internal space, the hard disk drive comprising:
an enclosure base enclosing at least a portion of said internal space;
a printed circuit board (PCB) coupled with said base external to said internal space;
an electrical feed-through adhered with an adhesive to said base and providing an electrical path between said PCB and said internal space; and
an adhesive leak channel structural feature positioned in an area of said adhesive, wherein said leak channel structural feature inhibits leakage of gas from said internal space through said adhesive;
wherein said adhesive is positioned between said base and said feed-through, and wherein said leak channel structural feature forms a recess having a substantially U-shaped cross-section and extending into said base, and wherein a portion of said adhesive is disposed within and over said recess, and a portion of said adhesive is disposed adjacent to said recess, such that a depth of said adhesive disposed within and over said recess is greater than a depth of said adhesive disposed adjacent to said recess.

10. A hard disk drive having an internal space, the hard disk drive comprising:
an enclosure base enclosing at least a portion of said internal space;
a printed circuit board (PCB) coupled with said base external to said internal space;
an electrical feed-through adhered with an adhesive to said base and providing an electrical path between said PCB and said internal space; and
an adhesive leak channel structural feature positioned in an area of said adhesive, wherein said leak channel structural feature inhibits leakage of gas from said internal space through said adhesive;
wherein said adhesive is positioned between said base and said feed-through, and wherein said leak channel structural feature is constituent to said base and forms a series of increasingly smaller structures, in a direction from said internal space through said adhesive, extending from said base toward said feed-through, and wherein portions of said adhesive are disposed between said series of structures and said feed-through such that respective depths of said adhesive disposed between each said structure and said feed-through increase in said direction.

11. A hard disk drive having an internal space, the hard disk drive comprising:
an enclosure base enclosing at least a portion of said internal space;
a printed circuit board (PCB) coupled with said base external to said internal space;
an electrical feed-through adhered with an adhesive to said base and providing an electrical path between said PCB and said internal space; and
an adhesive leak channel structural feature positioned in an area of said adhesive, wherein said leak channel structural feature inhibits leakage of gas from said internal space through said adhesive;
wherein said adhesive is positioned between said base and said feed-through, and wherein said leak channel structural feature comprises a convex solder ring on a bonding surface of said feed-through, and wherein a portion of said adhesive is disposed between said solder ring and said base, and a portion of said adhesive is disposed adjacent to said solder ring, such that a depth of said adhesive disposed adjacent to said solder ring is greater than a depth of said adhesive disposed between said solder ring and said base.

12. The hard disk drive of claim 11, wherein said convex solder ring is disposed around and near the outer perimeter of said feed-through.

13. A hard disk drive having an internal space, the hard disk drive comprising:
an enclosure base enclosing at least a portion of said internal space;
a printed circuit board (PCB) coupled with said base external to said internal space;
an electrical feed-through adhered with an adhesive to said base and providing an electrical path between said PCB and said internal space; and
an adhesive leak channel structural feature positioned in an area of said adhesive, wherein said leak channel structural feature inhibits leakage of gas from said internal space through said adhesive;
wherein said adhesive is positioned between said base and said feed-through, and wherein said leak channel structural feature comprises a conductor pad ring on a bonding surface of said feed-through, and wherein a portion of said adhesive is disposed between said conductor pad ring and said base, and a portion of said adhesive is disposed adjacent to said conductor pad ring, such that a depth of said adhesive disposed adjacent to said conductor pad ring is greater than a depth of said adhesive disposed between said conductor pad ring and said base.

\* \* \* \* \*